United States Patent [19]

Cole, Jr. et al.

[11] Patent Number: 4,512,754
[45] Date of Patent: Apr. 23, 1985

[54] METAL CHAIN-BELT

[75] Inventors: Edward H. Cole, Jr.; Timothy J. Ledvina, both of Ithaca, N.Y.

[73] Assignee: Borg-Warner Corporation, Chicago, Ill.

[21] Appl. No.: 485,781

[22] Filed: Apr. 18, 1983

[51] Int. Cl.³ .................. F16G 13/08; F16G 5/18
[52] U.S. Cl. .................... 474/245; 474/201
[58] Field of Search ........... 474/245, 242, 244, 201, 474/272; 74/59, 202

[56] References Cited

U.S. PATENT DOCUMENTS 902,224 10/1908 Fouillaron .................. 474/201
1,691,892 11/1928 Reeves ...................... 474/245
4,313,730 2/1982 Cole, Jr. et al. ............. 474/245 X Primary Examiner—Stephen J. Novosad
Assistant Examiner—Thuy M. Bui
Attorney, Agent, or Firm—Aubrey L. Burgess

[57] ABSTRACT

A chain-belt for drivingly interconnecting pulleys of a pulley transmission comprises a chain with load blocks surrounding the link sets and located between adjacent pivot means. Each load block has at least a pair of side-by-side windows through which chain links extend, the windows being separated by a central strut joining the upper and lower spans of the blocks, reducing deflections and twisting of the block spans due to the loading thereon from the pulleys.

11 Claims, 17 Drawing Figures

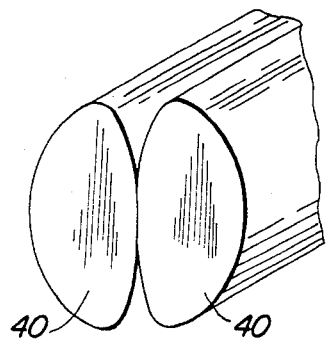
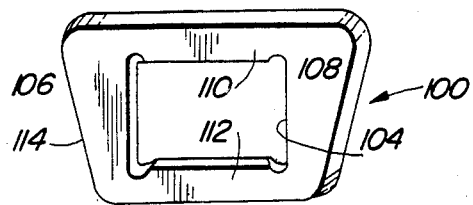
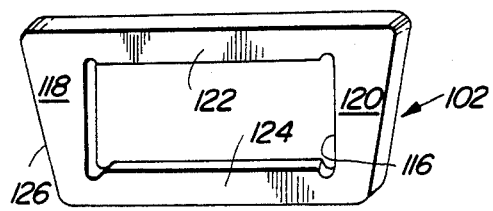
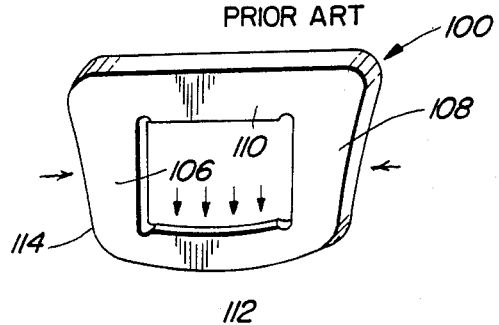
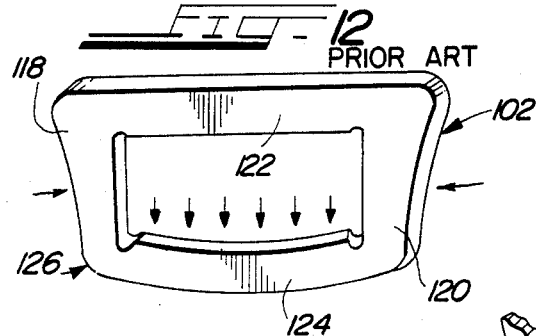
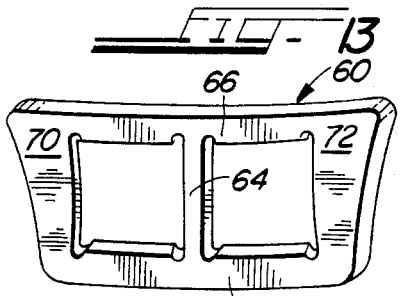
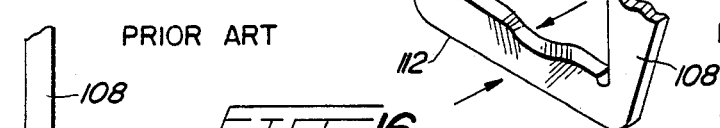
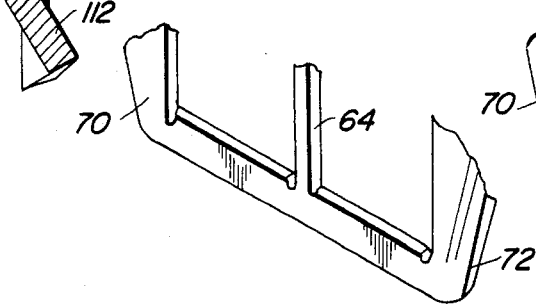
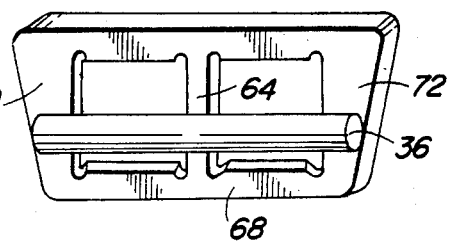

METAL CHAIN-BELT

BACKGROUND OF THE INVENTION

Variable pulley transmissions for transferring torque from an input shaft to an output shaft have been used for some time. In such arrangements a first pulley is mounted on the input shaft, and this pulley has at least one flange axially movable relative to its other flange to change the effective pulley diameter. A second, similarly adjustable pulley is mounted on the output shaft. A flexible belt intercouples the two pulleys to transfer torque between them. As the effective diameter of one pulley is changed, and simultaneously the effective diameter of the other pulley is changed in the opposite direction, the drive ratio between the input and output shafts is adjusted in a smooth, continuous manner.

For several decades automotive engineers have recognized that the maximum operating efficiency of the engine could be achieved if the transmission could be controlled by adjusting to different loads and speed ratios such that the engine is maintained at its maximum efficiency point. This is not possible with a conventional geared transmission in which the drive ratio is adjusted in discrete steps, rather than continuously. Accordingly, efforts have been directed to the use of a continuously variable transmission of the type described above. This has resulted in the production and marketing in Europe of the Daf passenger car, using a flexible rubber belt in such a continuously variable transmission (CVT). Such a belt is subject to wear by reason of the torque it must handle, and operates under severe temperature, vibration and other adverse conditions. To improve the belt life, efforts have been channeled to produce a flexible belt of metal, and some of these efforts are described in the patent literature.

One metal belt approach was a central indexing strand composed of a plurality of nested metal bands on which are threaded a plurality of generally trapezoidal or V-shaped (when viewed from the front) metal load or drive blocks, the blocks being longitudinally slidable along the indexing strand during operation. Because the individual blocks are in compression as they transfer torque between the pulleys, this type of flexible belt is frequency termed a "push" belt. It is relatively expensive to manufacture because the metal bands must be matched for their nested assembly, the load blocks must be stamped and finished, then the blocks must be assembled onto the strand of nested bands. An example of this type of push belt is described in U.S. Pat. No. 3,720,112.

Another type of flexible metal utilizes a chain as the indexing strand, in lieu of the more expensive nested band array. Hence such a belt is generally termed a "chain-belt". The chain link sets are connected to cylindrical pins, or other suitable pivot means. The drive blocks are generally trapezoidal or V-shaped and are positioned between a pair of consecutive pivot members. The drive or load blocks in a chain-belt have little, if any, longitudinal movement with respect to the chain. The load blocks generally transmit the load to the chain and the pivot members. This type of chain-belt is termed a "pull" belt, and is much less expensive to manufacture than the "push" belt before described, because the chain links and the load blocks are stamped from sheet metal and the parts are assembled by automatic machinery. There is no need to match band lengths required for nesting the endless bands for the push type belt. An example of a pull type chain-belt is described in U.S. Pat. No. 4,313,730.

As shown in the latter patent, each load block of an assembly defines a central window through which links pass, i.e., the load blocks surround the sets of links. For low torque applications, a relatively narrow load block (and chain) can be used. As the torque requirements are increased, wider chain is required which also requires wider load blocks. Because of the loading of the blocks, at least the bottom span of the block is stressed and at times deflects and twists, leading to block failure. The present invention is particularly directed to improve load blocks for a pull type chain-belt, to enable the chain-belt to transfer a higher torque between the pulleys than is possible with known arrangements.

SUMMARY OF THE INVENTION

According to the invention to be described herein, an improved pull type chain-belt is provided in which the drive or load blocks are provided with at least one vertical support column to improve the load bearing capacity of the load blocks. Thus, the load blocks have at least a pair of windows separated by the vertical support column which joins the lower block span and the upper block span. Both lower and upper block spans actively carry portions of the load, and the deflection and twisting of the blocks are reduced, thereby improving life and durability of the belt. Additionally, the pivot members joining the link sets are supported not only at their ends by the blocks but also centrally by the vertical support column, so that pin bending stresses are relieved under high torque conditions.

For relatively wide belts, two or more centrally located columns or struts can be used, providing three or more windows in each load block. The torque bearing capacity of the blocks can be further improved by modifying or "crowning" the top of the blocks, i.e., making the upper span deeper at its center and tapering toward the side edges.

BRIEF DESCRIPTION OF THE DRAWINGS

FIG. 8 is an isometric illustration of a modification of a pivot means usable in the chain-belt of FIG. 3;

FIG. 9 is an illustration of a prior art narrow load block and is labeled "prior art";

FIG. 10 is an illustration of a prior art wide load block and is labeled "prior art";

FIGS. 11 and 12 are illustrations of one form of distortion due to loads on prior art blocks of FIGS. 9 and 10 types;

FIG. 13 is an illustration showing one form of distortion due to loads on a block of the FIG. 4 type;

FIGS. 14 and 15 showing twisting effects of loads on prior art blocks of the FIGS. 9 and 10 types;

FIG. 16 shows the effects of twisting on a load block of this invention; and

FIG. 17 shows a load block of this invention and a pivot or joint member, the latter contacting the block at three locations.

DETAILED DESCRIPTION OF THE PREFERRED EMBODIMENT

Figure 1:
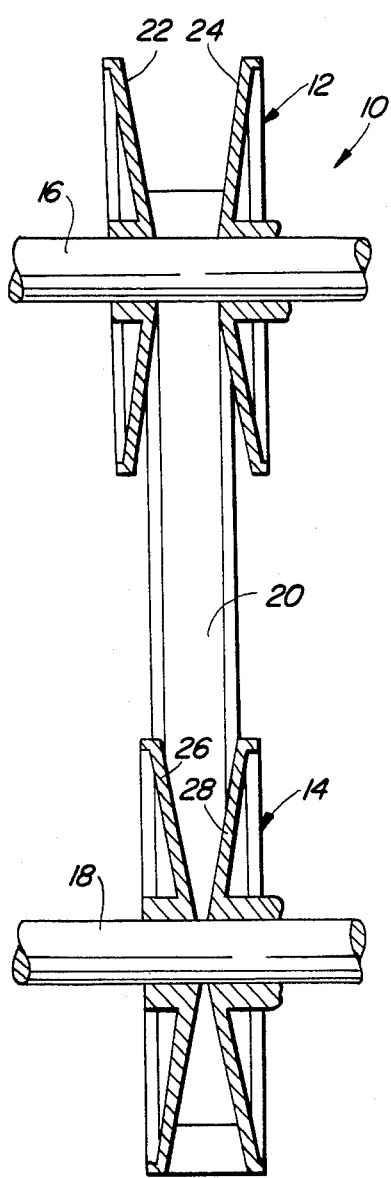
FIGS. 1 and 2 are schematic illustrations of a typical variable pulley transmission in which the chain belt of this invention is usable showing the transmission in two different drive ratios.
Figure 2:
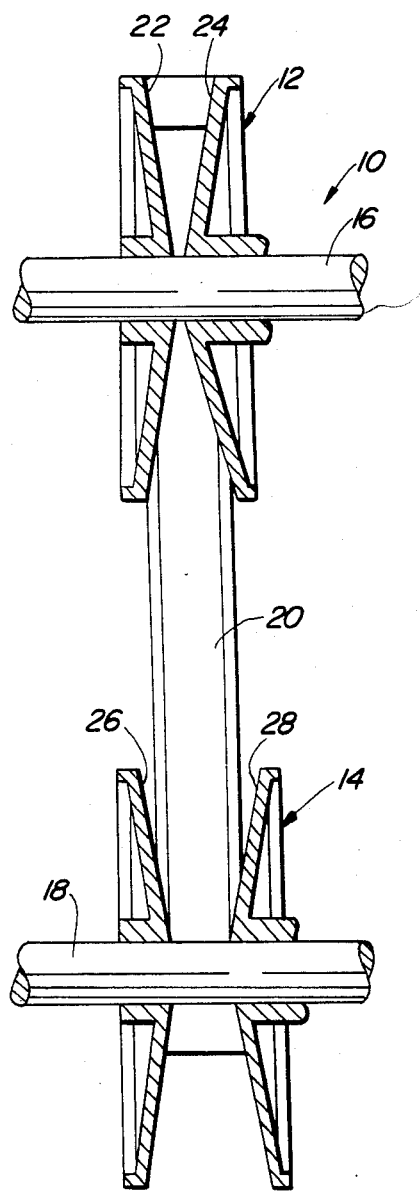

FIGS. 1 and 2 illustrate schematically a variable pulley transmission 10, also referred to as a continuously variable transmission (CVT), in different drive ratios, the transmission comprising a pair of pulleys 12 and 14 with pulley 12 connected to shaft 16 and pulley 14 connected to shaft 18. For purposes of description, shaft 16 will be referred to as the driver shaft and shaft 18 will be referred to as the driven shaft. Pulleys 12 and 14 are drivingly connected by belt. Belt 20 is only schematically illustrated in FIGS. 1 and 2; a suitable form can be the chain-belt of this invention. Pulley 12 comprises flanges 22 and 24 while pulley 14 comprises flanges 26 and 28. At least one flange of each pulley is axially movable relative to the other flange of the pulley. Means not forming a part of this invention, and therefore not described or shown, are provided to change the axial spacing between the pulley flanges to change the drive ratio between the pulleys, and thus between shafts 16 and 18. In FIG. 1 of the drawings, the transmission is in its low ratio drive, while in FIG. 2, the transmission is in its high ratio drive.

Figure 3:
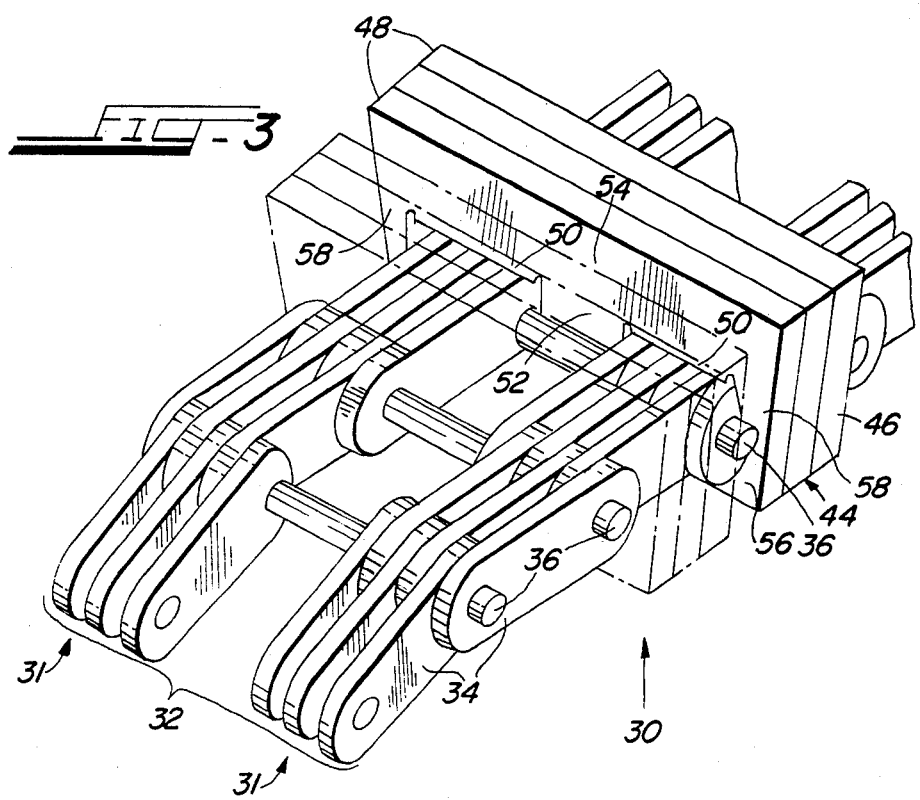
FIG. 3 is an isometric illustration of part of a chain-belt constructed according to this invention.

One form of a chain-belt constructed according to this invention and usable in a transmission of the type shown in FIGS. 1 and 2, is illustrated in FIG. 3 of the drawings. The complete chain-belt is an endless assembly, of which a segment 30 is shown. The chain-belt comprises a plurality of sets or ranks 32 of links 34 which are interleaved with one another. Each set or rank 32 of the links includes two separate subsets 31A, 31B of the links, spaced apart from each other for reasons that will become apparent. The adjacent sets of links are joined by pivot means 36, shown as round pins. It is understood that the pivot means can be a rocker joint, comprising, for example a pair of like members, 40, 40 (see FIG. 8) each with a front surface 42, 42 rocking on one another. Pivot means of this type is described and claimed in a copending application, Ser. No. 442,386, filed Nov. 17, 1982, the application being assigned to the assignee of this application. Other types of joint members can be used without departing from the invention herein described.

At least one drive or load block assembly 44 of generally trapezoidal or V-shaped (when viewed from the front) is located between each pair of adjacent pivot means. The edges 46 of each block assembly are adapted to frictionally engage the flanges of the pulleys of the transmission. Assemblies 44 may include only a single load block or may be composed of multiple blocks or plate-like members 48, all of which have the same shape. Block members 48 can be die formed from sheet metal stock making the multiple piece construction attractive from manufacturing and cost considerations. Each block 48 is provided with at least a pair of windows 50 through which a link subset section 31A or 31B passes, the windows 50 being separated by a column or strut 52 joining upper block span 54 and lower block span 56. Each block span has a width corresponding to the side-to-side width of the block, a thickness corresponding to the front-to-back thickness of the block and a depth, this dimension measured from the top or the bottom of the block to a window. A pivot means 36 contacts the struts 52 of the adjacent blocks 44 as well as outside edge columns 58, 58 and thus is supported against bending by three parts of a block 44.

Figures 4, 5:
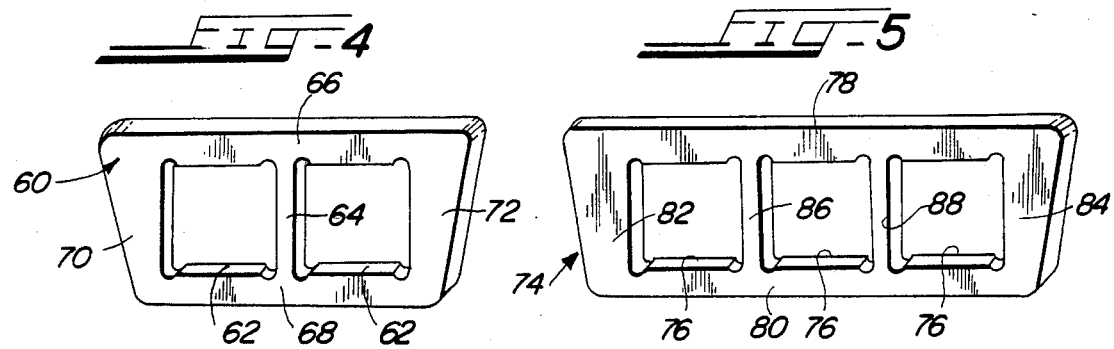
FIG. 4 is an isometric illustration of one form of load block for a chain-belt according to this invention.
FIG. 5 is an isometric illustration of another form of load block for a chain-belt according to this invention.

FIGS. 4, 5, 6, and 7 each illustrate a different form of a load or drive block which can be used in a chain-belt according to this invention. Load block 60 illustrated in FIG. 4 is similar to load block 48 illustrated in FIG. 3. Block 60 has a pair of windows 62 separated by a column or strut 64. Strut 64 connects upper span 66 and lower span 68. Edge columns 70 and 72 also connect the upper and lower spans. Block 74 illustrated in FIG. 5 is wider than block 60, and block 74 has three windows 76. The upper and lower spans 78 and 80 of block 60 are connected by edge portions or columns 82 and 84 and centrally located columns or struts 86 or 88. This form of block accommodates a chain constructed of three transversely spaced sections or subsets of links, each section shares the same pivot means, as in the two sections of chain of FIG. 3. Additional windows can be provided in blocks as necessary or desirable.

Figures 6, 7:
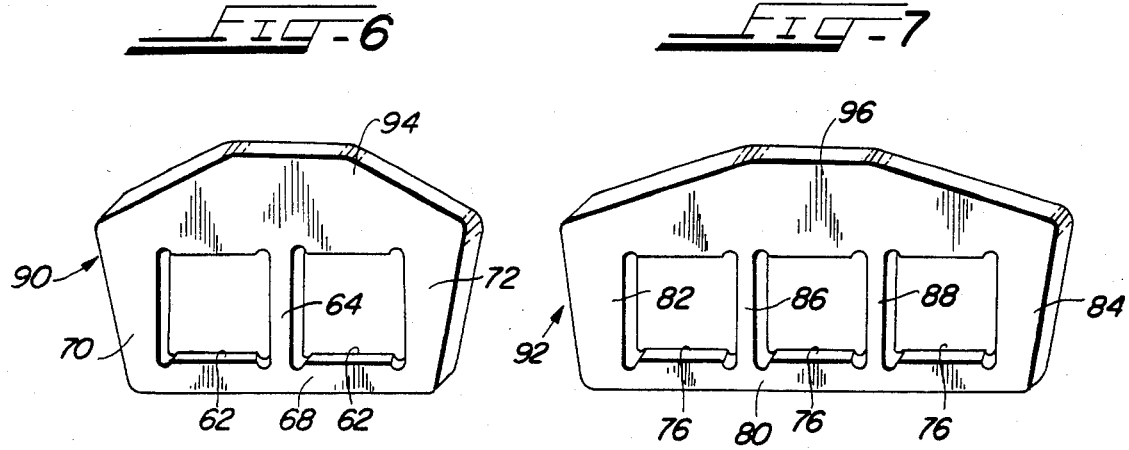
FIG. 6 is an isometric illustration of still another form of load block for a chain-belt according to this invention.
FIG. 7 is an isometric illustration of yet another form of load block for a chain-belt according to this invention.

Blocks 90 and 92 illustrated in FIGS. 6 and 7 are similar to those of FIGS. 4 and 5, except they are provided with "arched" upper spans 94 and 96. Upper spans 94 and 96 are deeper at their centers, tapering to the edge columns 70, 72 and 82, 84. The remainder of these blocks are the same as in FIGS. 6 and 7 and are identified with similar reference characters.

The side-to-side windows of each type of two window blocks are preferably the same size; otherwise an unbalance in the performance of the chain-belt can be expected. The outside windows of a three windows block are generally the same size; the centrally located window can be of a different size without causing an unbalance in the chain-belt. While two and three window blocks have been illustrated and described, blocks with more than three windows can be used. The two window block with the arched upper span is the preferred embodiment.

FIGS. 9 and 10 illustrate prior art load blocks 100 and 102, the difference in the blocks being their side-to-side width. Load block 100 has a single window 104 defined by end struts 106, 108 and upper and lower spans 110, 112. The edges 114 are angled to frictionally engage the flanges of pulleys of a transmission and the the blocks are assembled on a chain as taught in the prior art. Load block 102 has a window 116 defined by end struts 118, 120 and upper and lower spans 122, 124. The edges 126 are angled to frictionally engage the pulley flanges of a pulley transmission.

The forces acting on load blocks 100 and 102 are shown by arrows in FIGS. 11 and 12. The end struts 106, 108 and 118, 120 are distorted inwardly toward the windows 104, 116 and the lower spans 112, 124 are deflected downwardly. These lower spans also twist as depicted in FIGS. 14 and 15, leading to failure of the blocks and thus of the chain-belt of which they are a part.

FIGS. 13 and 16 illustrate the forces on a two window version of a load block 60 of this invention. While the edge struts 70, 72 deflect slightly inwardly, the deflection of the lower span 68 is less than in the prior art blocks because the deflection load is shared by both the upper and lower spans 66, 68 through the strut 64. Twisting of the lower strut 68 is almost eliminated.

The blocks 90, 92 of FIGS. 6 and 7 are less subject to lower strut deflections under load because of the arched upper spans 94, 96.

FIG. 17 illustrates the sharing of horizontal or lateral loads imposed on the struts 70, 72, 64 of a two window block by a pivot means or joint member 36. This substantially reduces bending of the members 36 under extreme horizontal or lateral loads.

Generally in chain-belts of the type described herein, the load blocks, the links, and the pivot means are constructed of metal, for example, various types of steel. The pivot means are usually manufactured of a higher carbon steel than the load blocks, which in turn, are of a higher carbon steel than the chain links. The pivot means are generally heat treated to increase their strength. The chain links and the load blocks can be stamped from sheet metal using known stamping techniques. The pivot means can be cut from a drawn metal shape. Each load block assembly can be a single solid member or a laminate of metal plates as shown herein.

I claim:

1. A chain-belt especially adapted to drivingly connect pulleys of a pulley transmission, said chain-belt comprising:
    a plurality of transversely arranged sets of links, adjacent sets of links being interleaved with one another;
    pivot means joining said adjacent sets of links to provide an endless assembly of links;
    a plurality of load blocks, each of which is located between a pair of pivot means,
    each load block having edges adapted to frictionally engage the pulleys of the pulley transmission,
    each load block defining at least a pair of windows defined by an upper and a lower transverse span and an integral column which joins said spans and separates said windows,
    each load block windows encircling the links of one set of links, with said load block column separating some links of said one set of links from other links of said one set of links.

2. A chain-belt as recited in claim 1, in which each load block column in at least some of said load blocks is generally centrally located.

3. A chain-belt as recited in claim 1, in which at least some of said load blocks are positioned to contact at least one pivot means.

4. A chain-belt as recited in claim 1, in which each of said load blocks is positioned to contact at least one of said pivot means.

5. A chain-belt as recited in claim 1, in which each load block has two windows, and said column is generally centrally located.

6. A chain-belt as recited in claim 1, in which each load block defines three windows and a pair of columns, each column separating an adjacent pair of said windows.

7. A chain-belt as recited in claim 1, in which said upper block spans are substantially uniform in depth.

8. A chain-belt as recited in claim 1, in which said upper block spans vary in depth the deepest part being generally centrally located.

9. A load block for a power transmission chain-belt comprised of links and especially adapted for connecting pulleys of a pulley transmission comprising:
    a generally trapezoidal metal member defining at least a pair of separate windows through which said links pass,
    said block having tapered outer sides, a column separating said windows, and upper and lower span portions;
    said column being integral with and joined to said upper and lower span portions.

10. A load block as defined in claim 9, in which said upper span is of varying depth, the widest portion being generally centrally located.

11. A power transmission chain-belt for use in a pulley transmission comprising the combination of a chain and drive blocks, said drive blocks each comprising at least one metal member of generally trapezoidal configuration when viewed from the front and having tapered ends for drivingly engaging the pulleys of said transmission, and at least a pair of side-by-side windows each bounded on all sides by portions of said block and through which said chain passes, a web portion of said block separating adjacent windows, said web portion extending in the same general direction as said tapered ends, said chain comprising a plurality of links arranged as sets of links with the adjacent sets of links being interleaved with one another, pivot means joining the next adjacent sets of links, each pivot means being so located to at least engage at least a web of a drive block, said chain having one part comprising a group of links of a set passing through one window of each block and another part comprising another group of links of a set passing through another window of each block.

* * * * *